United States Patent Office 3,419,572
Patented Dec. 31, 1968

3,419,572
RING SYNTHESIS OF HALO-SUBSTITUTED
1,2,5-THIADIAZOLES
Leonard M. Weinstock, Rocky Hill, and Barry Handelsman, Rahway, N.J., assignors to Merck & Co., Inc., Rahway, N.J., a corporation of New Jersey
No Drawing. Filed Sept. 30, 1964, Ser. No. 400,584
5 Claims. (Cl. 260—302)

ABSTRACT OF THE DISCLOSURE 3-halo- and 3,4-dihalo-1,2,5-thiadiazoles are prepared by reacting together an aminoacetonitrile and a sulfur halide. Mono-halo derivatives are obtained by employing sulfur monohalide as the sulfur halide and dihalo derivatives are obtained by employing sulfur dihalide as the sulfur halide. The latter reaction is carried out in the presence of free halogen.

This invention relates generally to the synthesis of thiadiazole compounds. More particularly, it relates to the synthesis of 3-halo and 3,4-dihalo-1,2,5-thiadiazole compounds. It relates further to new 1,2,5-thiadiazole compounds produced according to such synthesis.

3-halo-1,2,5-thiadiazole and the 4-hydrocarbonyl derivatives thereof, which compounds are represented by the formula

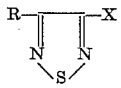

where X is chloro or bromo, and R is hydrogen, loweralkyl or phenyl, are important intermediates in the synthesis of 3-sulfanilamido-1,2,5-thiadiazole and 3-sulfanilamido-4-loweralkyl (or 4-phenyl)-1,2,5-thiadiazole, which compounds have antibacterial and anticoccidial activity. 3,4-dihalo-1,2,5-thiadiazole of the formula

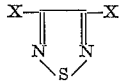

where X is chloro or bromo, are polymer solvents and fire retardants. One object of the present invention is provision of a new and convenient method of making these mono- and di-halo-1,2,5-thiadiazole compounds. A more specific object is to provide a synthesis of such halo-thiadiazoles from readily available aminonitriles and sulfur halides. An additional object is to provide new and novel 3-halo-1,2,5-thiadiazoles. Further objects will be clear from the ensuing description of the invention.

According to the present invention, it has now been found that 3-halo- and 3,4-dihalo-1,2,5-thiadiazoles are produced by reacting together aminoacetonitrile and a sulfur halide. A monohalo or dihalo-thiadiazole is obtained according to the particular sulfur halide employed for reaction with the aminoacetonitrile:

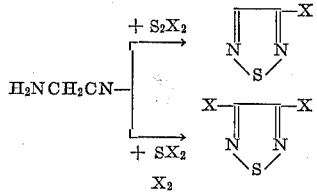

where X represents chlorine or bromine (i.e. halogen having an atomic weight between 35 and 80). For the sake of convenience, the invention will be described primarily with respect to formation of chloro-1,2,5-thiadiazole compounds from the appropriate sulfur chlorides, but it is to be understood that the description applies as well to preparation of the bromo thiadiazoles, from sulfur bromides. The synthesis of the chloro compounds from aminoacetonitrile and a sulfur chloride is a preferred embodiment of this aspect of the invention because of the more ready availability of the sulfur chloride reactants.

As is clear from the above flow chart, reaction of aminoacetonitrile with sulfur monochloride yields 3-chloro-1,2,5-thiadiazole; when the nitrile is reacted with sulfur dichloride and chlorine, 3,4-dichloro-1,2,5-thiadiazole is produced. Synthesis of the monohalo-thiadiazoles will be described first.

The new synthesis of 3-chloro-1,2,5-thiadiazole is carried out by intimately contacting aminoacetonitrile and sulfur monochloride in a suitable reaction medium. The stoichiometry of the reaction requires 2 moles of sulfur monochloride per mole of amino nitrile, and, if desired the reactants may be employed in these quantities. For best results, however, a stoichiometric excess of sulfur monochloride is used preferably from about 2.5–8 moles of sulfur monochloride per mole of nitrile. The aminoacetonitrile starting material is conveniently obtained in the form of an acid addition salt, such as the bisulfate, sulfate, hydrochloride or hydrobromide, and such salt may be used directly in the process rather than converting it separately to the free base. The nature of the acid addition salt is not critical since the acid does not participate in the reaction proper. A dialkyl alkanoamide, for instance dimethyl acetamide or dimethyl formamide is the preferred solvent medium although other solvents such as tetrahydrofuran may be employed. The reaction time and temperature conditions are not unduly critical, and as might be expected, are interdependent. Thus, the preferred reaction time will be less as the reaction temperature is increased. The reaction of the aminoacetonitrile with sulfur monocholride is an exothermic one, and in solvent media where it proceeds rapidly, such as dimethylformamide, it is desirable to carry it out in the cold, i.e. between about —10° C. and 15° C., in order to avoid or minimize any undesired side reactions. Higher temperatures of up to about 75° C. may be used, however, as long as the rate of reaction is controlled.

It has been found that for best results in preparing 3-chloro-1,2,5-thiadiazole by this process, the order in which the reactants are mixed is of importance. Much higher yields of desired product are obtained, and formation of tar and undesired by-products minimized, by adding the aminoacetonitrile to a mixture of sulfur monochloride and reaction solvent, rather than the reverse addition of sulfur monochloride to the nitrile. This method of beginning the reaction is, therefore, a preferred method of carrying out the thiadiazole synthesis.

Also within the purview of the invention is the application of this process to the synthesis of 3-halo-4-loweralkyl (or 4-phenyl)-1,2,5-thiadiazoles. Such compounds are obtained by reacting sulfur monochloride, under the previously described conditions, with an α-amino-α-loweralkyl (or α-phenyl) acetonitrile. The preparation of 3-halo-1,2,5-thiadiazoles by the process of the invention may thus be described structurally as

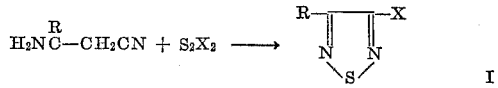
I

X represents chlorine or bromine, and R is hydrogen, loweralkyl or phenyl. In addition to 3-halo-1,2,5-thiadiazole itself, examples of compounds so produced are 3-chloro-4-methyl-1,2,5-thiadiazole from α-amino-α-methylacetonitrile and sulfur monochloride; 3-chloro-4-phenyl-1,2,5-thiadiazole from α-amino-α-phenylacetonitrile and sulfur monochloride; 3-bromo - 4 - ethyl-1,2,5-thiadiazole from α-amino-α-ethylacetonitrile and sulfur monobromide; 3-bromo-4-methyl-1,2,5-thiadiazole from α-amino-α-methylacetonitrile and sulfur monobromide.

3-chloro-1,2,5-thiadiazole, and the other 3-halo-1,2,5-thiadiazoles of Formula I above, may be recovered from the reaction mixture by recognized isolation techniques. They steam distil and one very convenient method of recovery is addition of water to the reaction mixture followed by steam distillation. They may be further purified by distillation.

All of these compounds may be converted to the corresponding sulfa drugs of the formula

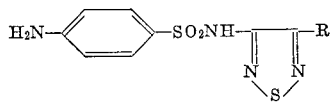

by reaction with sulfanilamide in the presence of an acid binding agent (R being as previously defined).

Instead of 3-chloro-1,2,5-thiadiazoles, 3,4-dichloro-1,2,5-thiadiazole is obtained according to the present invention by reacting aminoacetonitrile with a mixture of sulfur dichloride and chlorine instead of sulfur monochloride. This is accomplished by intimately contacting aminoacetonitrile, sulfur dichloride and chlorine in a suitable reaction medium. On a theoretical basis one mole of both the sulfur dichloride and chlorine are required per mole of aminoacetonitrile. The reactants may be employed in equimolar amounts if desired, but it is preferred to employ an excess of both chlorine and sulfur dichloride since higher yields of the dichlorothiadiazole are thereby obtained. Good results are achieved by using from about 1.25–5 moles of sulfur dichloride per mole of aminoacetonitrile, and at least an equal excess of chlorine.

The reaction is carried out in a solvent medium. The solvents and other conditions, such as time, temperature and use of nitrile acid addition salts, are basically the same as those previously discussed for the 3-monochlorothiadiazole and need not be repeated. As in the other aspect of the invention, a preferred and important factor for obtaining best results is initiation of the reaction by addition of aminoacetonitrile (either the free base or an acid addition salt) to the sulfur dichloride-chlorine mixture rather than the reverse.

It will be noted that a mixture of chlorine and sulfur dichloride is necessary for production of 3,4 - dichloro-1,2,5-thiadiazole, in contrast to making the monochloro thiadiazole where sulfur monochloride alone is required. There is substantial free chlorine present in the commercially available sulfur dichloride products, and this is sufficient for obtaining 3,4 - dichloro - 1,2,5 - thiadiazole without the addition of extraneous chlorine. For optimum yields of dichloro-thiadiazole, however, it is preferred to have the reaction mixture saturated with chlorine, and this is conveniently brought about by adding chlorine to the reaction mixture during the early stages of the process, i.e., during and immediately following addition of aminoacetonitrile to the sulfur dichloride. The 3,4-dichloro-1,2,5-thiadiazole thus obtained has a relatively low boiling point (85° C./85 mm.) and is conveniently purified by distillation. It is readily recovered from the reaction mixture by steam distillation after addition of water to the reaction mass. It may then be further purified by distillation. It will be understood that 3,4-dibromo-1,2,5-thiadiazole is produced under the above conditions by substituting sulfur dibromide and bromine for the chloro compounds.

As will be understood by those skilled in the art, preparations of sulfur dichloride usually contain both chlorine and sulfur monochloride, the three products being in equilibrium. For this reason, reaction of aminoacetonitrile with a sulfur dichloride preparation in accordance with this invention will normally afford a mixture of 3,4-dichloro - 1,2,5 - thiadiazole and 3-chloro-1,2,5-thiadiazole.

It is our belief that the dihalo compound is due to the sulfur dichloride and chlorine, and the mono-halo to the sulfur monochloride. With the commercially available sulfur dichloride products, the two thiadiazoles are produced in approximately equal amounts. This ratio is influenced to some degree by the choice of reaction conditions, formation of monochloro thiadiazole being favored at lower reaction temperatures and with moderate excesses of sulfur dichloride. Saturation of the reaction with chlorine favors production of 3,4 - dichloro-1,2,5-thiadiazole. Sulfur monochloride can be obtained substantially free of sulfur dichloride, and when such product is employed in the reaction with aminoacetonitrile, the resulting product is essentially completely 3-chloro-1,2,5-thiadiazole. When both mono- and dichloro-thiadiazole are formed in the same reaction mixture, they can be separated by careful fractional distillation.

The following examples are given for the purpose of illustration and not by way of limitation.

EXAMPLE 1

3-chloro-1,2,5-thiadiazole 243 ml. (3 moles) of sulfur monochloride is added to 450 ml. of dimethylformamide at 0–5° C. To the stirred solution there is added 154 grams (1 mole) of aminoacetonitrile bisulfate over 30 minutes at 0–5° C. The reaction mass is then stirred for 22 hours at about 0° C. and finally poured into 450 ml. of ice water. The resulting mixture is distilled at atmospheric pressure until the vapor pressure reaches 107° C. The distillate of water and 3 - chloro - 1,2,5 - thiadiazole is extracted with 100 ml. and then with 30 ml. of petroleum ether. The petroleum ether extracts are combined, washed with two 30 ml. portions of water and dried over magnesium sulfate. The ether solution is then distilled, the organic solvent distilling in the range 30–60° C. 3 - chloro-1,2,5-thiadiazole distills at 123–124° C. The product thus obtained is essentially pure material, $E\%_{263m\mu} = 717$ (methanol).

EXAMPLE 2

3-chloro-1,2,5-thiadiazole 12.15 ml. (0.15 mole) of sulfur monochloride is added to 25 ml. of stirred dimethyl acetamide at 0–5° C. To this solution is added 5.7 g. (0.037 mole) of aminoacetonitrile bisulfate over a half hour period at 0–5° C. The reaction mixture is stirred for two hours at room temperature, and then 50 ml. of water is added. The resulting yellow slurry is steam distilled. The distillate contains 3-chloro-1,2,5-thiadiazole, which is recovered and purified by the procedure described in Example 1.

EXAMPLE 3

3-chloro-1,2,5-thiadiazole 12.15 ml. (0.15 mole) of sulfur monochloride is added to 22 ml. of stirred dimethyl formamide at 0–5° C. To this solution is added 2.8 g. (0.05 mole) of aminoacetonitrile free base over a half hour period at 0–5° C. The mixture is stirred for five hours at room temperature, and 25 ml. of water is then added. The mixture is steam distilled. The distillate contains 3-chloro-1,2,5-thiadiazole. This product is recovered by extraction into petroleum ether and distillation as in Example 1.

EXAMPLE 4

3,4-dichloro-1,2,5-thiadiazole

Chlorine gas is passed into a mixture of 190 ml. of sulfur dichloride and 450 ml. of dimethylformamide at 0° C. for 15 minutes. Addition of chlorine gas is continued while 154 grams of aminoacetonitrile bisulfate is added over a 30 minute period. The resulting mixture is then stirred for 30 minutes at 0–5° C., warmed to room temperature and stirred at room temperature for 5 hours. The addition of chlorine is continued until the reaction mixture has been at room temperature for one hour, at which time it is discontinued.

The reaction mixture is then poured into 450 ml. of ice water, and the resulting mixture distilled at atmospheric pressure until the vapor temperature reaches 107° C. The distillate, which consists of water and 3,4-dichloro-1,2,5-thiadiazole, is extracted with 100 ml. and then with 30 ml. of petroleum ether. The petroleum ether extracts are combined, washed with two 30 ml. portions of water and dried over magnesium sulfate. The ether solution is then distilled, the organic solvent distilling in the range 30–60° C. 3,4-dichloro-1,2,5-thiadiazole distills at 101–102° C. (122 mm.). The product thus obtained is essentially pure material.

When the above process is repeated using bromine gas in place of chlorine gas and an equimolar amount of sulfur dibromide in place of the sulfur dichloride, 3,4-dibromo-1,2,5-thiadiazole is produced.

EXAMPLE 5

3-chloro-1,2,5-thiadiazole 3,4-dichloro-1,2,5-thiadiazole 15.4 grams (0.1 mole) of aminoacetonitrile bisulfate is added over a 20 minute period to a solution of 19.2 ml. (0.3 mole) of commercial sulfurdichloride in 50 ml. of dimethylformamide. During the addition of nitrile the temperature is held between 15–20° C. The reaction mixture is then stirred at this temperature for two hours and then is poured into 400 ml. of water. The resulting mixture is extracted with three 150 ml. portions of methylene chloride. The methylene chloride extracts are combined, dried over magnesium sulfate and then distilled. The fraction boiling at 87–97° C./20 mm. (13.0 grams) is collected and assayed by vapor phase chromatography. It contains 26% of 3-chloro-1,2,5-thiadiazole, 25% of 3,4-dichloro-1,2,5-thiadiazole.

EXAMPLE 6

3-chloro-1,2,5-thiadiazole 7.7 grams (0.05 mole) of aminoacetonitrile bisulfate is added to a solution of 12.15 ml. (0.15 mole) of sulfur monochloride in 26 ml. of tetrahydrofuran. The mixture is heated at 100° C. for five hours in a sealed tube. It is then poured into 50 ml. of water and the entire mixture steam distilled. The distillate forms two layers, an aqueous and a tetrahydrofuran layer. The latter contains 600 mg. of 3-chloro-1,2,5-thiadiazole (by ultraviolet light assay).

EXAMPLE 7

3-chloro-1,2,5-thiadiazole 3,4-dichloro-1,2,5-thiadiazole

A mixture of 15.4 grams (0.01 mole) of aminoacetonitrile bisulfate, 6.4 ml. (0.1 mole) of sulfur dichloride and 50 ml. of tetrahydrofuran is sealed in a tube and the tube then heated at 100° C. for three hours. At the end of this time the mixture is removed from the tube and assayed by ultraviolet light assay. It contains a mixture of 3-chloro- and 3,4-dichloro-1,2,5-thiadiazole. A vapor phase chromatography assay of the entire mixture shows that the two compounds are present in substantially equal amounts.

EXAMPLE 8

3-chloro-4-methyl-1,2,5-thiadiazole 122 ml. of sulfur monochloride is added to 225 ml. of dimethylformamide at 0–5° C. The solution is stirred and chilled to 0–5° C. and to this solution there is added 84 grams of α-amino-α-methyl acetonitrile bisulfate over a period of 40 minutes. The reaction mixture is stirred for 14 hours at 0–10° C. and then poured into 200 ml. of ice water. The resulting mixture is steam distilled and the distillate containing water and 3-chloro-4-methyl-1,2,5-thiadiazole extracted with three 25 ml. portions of petroleum ether. The ethereal extracts are combined, washed with water and dried and the solvent removed by distillation at 30–60° C. The residue is substantially pure 3-chloro-4-methyl-1,2,5-thiadiazole which may be further purified by distillation.

When the above reaction is carried out using 91 grams of α-amino-α-ethyl acetonitrile bisulfate, or 115 grams of α-amino-α-phenyl acetonitrile bisulfate in place of the α-amino-α-methyl acetonitrile bisulfate, there is obtained 3-chloro-4-ethyl-1,2,5-thiadiazole and 3-chloro-4-phenyl-1,2,5-thiadiazole, respectively.

EXAMPLE 9

3-bromo-1,2,5-thiadiazole

When the method of Example 3 is repeated employing 34.6 ml. of sulfur monobromide in place of sulfur monochloride, there is obtained 3-bromo-1,2,5-thiadiazole.

EXAMPLE 10

3-sulfanilamido-1,2,5-thiadiazole

A mixture of 51.6 g. (0.3 mole) of sulfanilamide, 41.4 g. (0.3 mole) of potassium carbonate, 8.1 ml. (12.0 g., 0.1 mole) of 3-chloro-1,2,5-thiadiazole, and 12 g. of acetamide is heated with stirring at 125° C. for one hour. 100 ml. of water is added and the mixture distilled until the vapor temperature reaches 100° C. The residual solution is cooled, allowed to stand overnight and filtered to remove unchanged sulfanilamide. The filtrate is brought to pH 2–3 with concentrated hydrochloric acid. The precipitated 3-sulfanilamido-1,2,5-thiadiazole is filtered and washed with water. The yield of crude product is 10.8 g. The product is purified by dissolving in 40 ml. of water and 3.0 ml. of concentrated ammonia at room temperature. The solution is decolorized with charcoal and the filtrate made pH 3 with 3.6 ml. of concentrated hydrochloric acid. Pure 3-sulfanilamido-1,2,5-thiadiazole precipitates and is recovered by filtration.

Reaction of 3-chloro-4-loweralkyl-1,2,5-thiadiazole or 3-chloro-4-phenyl-1,2,5-thiadiazole with sulfanilamide according to the above process yields the corresponding 3-sulfanilamido-4-(loweralkyl or phenyl)-1,2,5-thiadiazole.

The 3-bromo-1,2,5-thiadiazole compounds obtained in accordance with the invention are reacted with sulfanilamide as above to afford the 3-sulfanilamido-1,2,5-thiadiazole compounds.

Any departure from the above description which conforms to the present invention is intended to be included within the scope of the claims.

What is claimed is:
1. The process for preparing 3-X-4-R-1,2,5-thiadiazole where X is selected from the class consisting of chlorine and bromine and R is selected from the class consisting of hydrogen, loweralkyl, and phenyl that comprises reacting a nitrile of the formula

H₂NCHRCN with a sulfur monohalide of the formula $S_2X_2$, where R and X are as defined above.

2. The process for preparing 3-X-4-R-1,2,5-thiadiazole where X is selected from the class consisting of chlorine and bromine and R is selected from the class consisting of hydrogen, loweralkyl, and phenyl that comprises reacting a nitrile of the formula

H₂NCHRCN with a sulfur monohalide of the formula $S_2X_2$, where R and X are as defined above, said reaction being initiated by addition of a member of the class consisting of the nitrile reactant and an acid addition salt thereof to the sulfur monohalide.

3. The process for preparing 3-chloro-1,2,5-thiadiazole that comprises reacting aminoacetonitrile with sulfur monochloride.

4. The process for preparing 3-chloro-1,2,5-thiadiazole that comprises reacting aminoacetonitrile with sulfur monochloride, said reaction being initiated by addition of an aminoacetonitrile acid addition salt to sulfur monochloride.

5. The process for preparing 3-chloro-4-loweralkyl-1,2,5-thiadiazole that comprises reacting a nitrile of the formula $$H_2NCHR_1CN$$

where $R_1$ is loweralkyl, with sulfur monochloride.

References Cited

UNITED STATES PATENTS

| | | | |
|---|---|---|---|
| 2,358,031 | 9/1944 | Roblin et al. | 260—239.9 |
| 3,090,721 | 5/1963 | Uhlenbrock et al. | 260—302 |
| 3,115,497 | 12/1963 | Vest et al. | 260—302 |

FOREIGN PATENTS 685,868  5/1964  Canada.

NICHOLAS S. RIZZO, *Primary Examiner.*

R. GALLAGHER, *Assistant Examiner.*

U.S. Cl. X.R.

260—239.95